Aug. 4, 1925.

W. A. McCOY

CORN SHOCK COMPRESSOR

Filed April 24, 1922

1,548,726

INVENTOR:
William A. McCoy,
By Frank K. Woerner
ATTORNEY.

Patented Aug. 4, 1925.

1,548,726

UNITED STATES PATENT OFFICE.

WILLIAM A. McCOY, OF DECATUR COUNTY, INDIANA.

CORN-SHOCK COMPRESSOR.

Application filed April 24, 1922. Serial No. 556,312.

*To all whom it may concern:*

Be it known that I, WILLIAM A. McCOY, a citizen of the United States, residing in the county of Decatur and State of Indiana, have invented certain new and useful Improvements in Corn-Shock Compressors, of which the following is a specification.

This invention relates to a device by which shocks of cornstalks may be compressed and held until the operator is able to place a permanent band around the shocks; and one of the objects of the invention consists in providing certain means for facilitating the work of initially compressing and holding the shocks of cornstalks until the permanent bands are placed into position, thereby producing shocks which are less liable to become distorted by reason of their greater compactness and stability than obtained where the shocks are compressed by hand.

A further object of the invention consists in the provision of a simple and inexpensive device whereby shocks of cornstalks may be quickly and easily compressed and so held by a single operator until the permanent bands are placed into operative position about the shocks.

I accomplish the above objects of the invention, and such others as may appear from a perusal of the following description and claims, by means of the construction illustrated in the accompanying drawings, forming a part thereof, in which—

Figure 1:
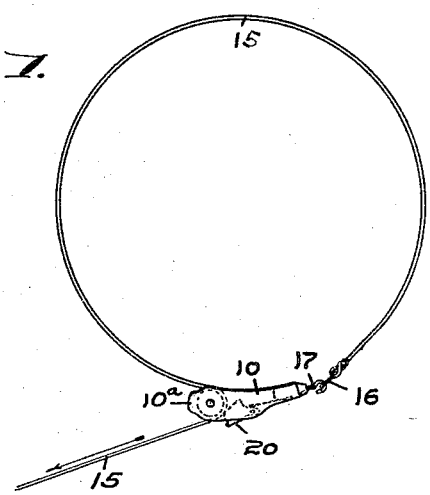
Figure 2:
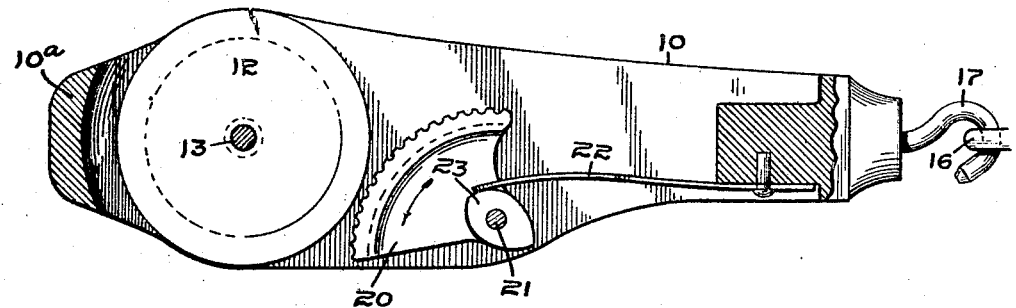
Figure 3:
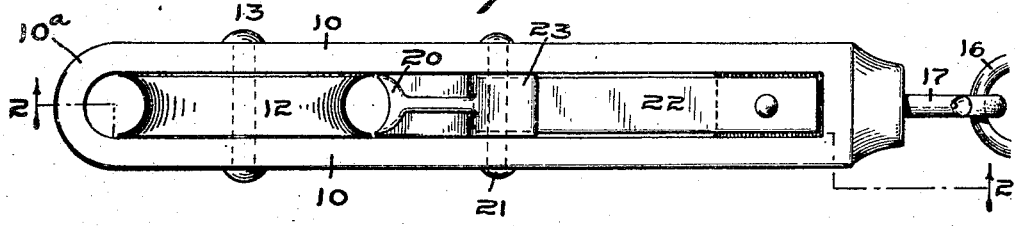

Figure 1 is a top or plan view of my invention, showing the rope or cord as it would appear extending around a shock of cornstalks. Fig. 2 is a longitudinal section of the device, on a considerably enlarged scale with the parts in the position of Figure 1, on the plane 2—2 in Fig. 3. Fig. 3 is an edge view of the construction shown in Fig. 2.

Referring to the drawings, 10 represents the body of the device which is preferably composed of metal and which is provided with a longitudinal slot 11. In one end of slot 11 I mount a grooved sheave-wheel 12 which rotates on a spindle 13, the width of the sheave-wheel being such as to snugly fill the space between the inner walls of the slot, and body 10 extends beyond sheave-wheel 12 and terminates in an extension $10^a$ which not only closes the end of slot 11 but also acts as a guard to reduce the liability of the entrance of foreign matter, to interfere with the action of sheave-wheel 12. As shown in Fig. 1, a rope or cord 15 is employed to extend around the shock and through which I apply the necessary compression to the latter. Rope 15 passes over sheave-wheel 12 and around the shock, and is provided in one end with a ring 16 which may be readily attached or detached from a hook 17, arranged in the end of body 10 opposite the end containing sheave-wheel 12. By means of the ring 16 and hook 17 construction, rope 15 may readily be passed around a shock of cornstalks and easily attached to body 10, and after the permanent band is placed into position on the shock the rope can easily be removed by disconnecting ring 16 from hook 17, thereby avoiding the necessity of removing the rope 15 from sheave-wheel 12.

After a shock of cornstalks is fully compressed it is desirable to thus hold the shock without further assistance on the part of the operator, thereby leaving the latter free to proceed with the work of placing the permanent band into operative position on the shock. This I accomplish by means of a swinging cam or gripping element 20 which is arranged in slot 11 and supported upon a spindle 21. To avoid the necessity of manually moving cam 20 into contact with rope 15, after sufficient compression has been applied to the shock, I provide means for applying a tension for automatically moving cam 20 in the proper direction to cause the face of the same to lightly clamp the rope 15 between the face of the cam and sheave-wheel 12. This automatic movement of cam 20 is preferably secured by means of a leaf spring 22, one end of which is permanently secured to body 10 with the free end of the spring resting upon an irregularly shaped hub 23 of cam 20. By means of this arrangement cam 20 may be swung outwardly against the resistance of the spring 22, but as soon as the pulling force is removed from the free end of rope 15 a reverse movement of the rope is set up, under the expansion action of the shock, so that cam 20 immediately moves inwardly under the influence of spring 22 and permits the rope to grip the same and be tightly impinged against the adjacent face of sheave-wheel 12, thereby preventing further inward travel of rope 15 and further expansion of the shock.

The invention is so simple that further detailed description thereof is deemed unnecessary.

Having thus fully described my said invention, what I desire to secure by Letters Patent, is—

1. In a corn shock compressor, a support, a pulley on the support, a rope for applying pressure to the shock secured at one end to the support and passing about the pulley, eccentric clamping means mounted on the support spaced from the pulley and coacting therewith to grip the rope, and means normally holding the face of the clamping means spaced from the pulley to an extent slightly less than the thickness of the rope but tending to prevent movement of the clamping means in either direction, substantially as set forth.

2. In a corn shock compressor, a support, a pulley on the support, a rope for applying pressure to the shock secured at one end to the support and passing about the pulley, clamping means pivoted on the support spaced from the pulley and coacting therewith to grip the rope, said clamping means comprising a segment having its working face eccentric to its pivot, and means normally holding the face of the segment spaced from the pulley slightly less than the thickness of the rope but tending to prevent rotation of said segment, substantially as set forth.

3. In a corn shock compressor, a support, a pulley on the support, a rope for applying pressure to the shock secured at one end to the support and passing about the pulley, eccentric clamping means mounted on the support spaced from the pulley and coacting therewith to grip the rope, and means normally holding the face of the clamping means spaced from the pulley to an extent slightly less than the thickness of the rope but tending to prevent movement of the clamping means in either direction, said means comprising an elliptical hub member carried by said clamping means and a leaf spring carried by said support and normally bearing against the side of said hub member, substantially as set forth.

4. In a corn shock compressor, a support, a pulley on the support, a rope for applying pressure to the shock secured at one end to the support and passing about the pulley, eccentric clamping means mounted on the support spaced from the pulley and coacting therewith to grip the rope, said clamping means having an elliptical hub and a substantially flat spring member carried by said support and bearing against the side of said hub for normally spacing the face of the clamping means from the pulley to an extent slightly less than the thickness of the rope but permitting the clamping means to be turned and held in the opposite direction away from said pulley, substantially as set forth.

In witness whereof, I, have hereunto set my hand and seal at Greensburg, Indiana, this 18th day of April, A. D., one thousand nine hundred and twenty-two.

WILLIAM A. McCOY. [L. S.]